(12) United States Patent
Forrest

(10) Patent No.: US 8,795,130 B2
(45) Date of Patent: Aug. 5, 2014

(54) QUICK DISCONNECT FOR A DRIVE UNIT

(75) Inventor: James L. Forrest, Ashley, IN (US)

(73) Assignee: Auburn Gear, Inc., Auburn, IN (US)

( * ) Notice: Subject to any disclaimer, the term of this patent is extended or adjusted under 35 U.S.C. 154(b) by 637 days.

(21) Appl. No.: 13/103,163

(22) Filed: May 9, 2011

(65) Prior Publication Data

US 2012/0031212 A1    Feb. 9, 2012

Related U.S. Application Data

(60) Provisional application No. 61/370,474, filed on Aug. 4, 2010.

(51) Int. Cl.
*F16H 3/44* (2006.01)
*F16D 11/04* (2006.01)

(52) U.S. Cl.
USPC ................ 475/302; 475/343; 192/69.43

(58) Field of Classification Search
USPC ......... 475/298, 269, 330, 300, 302, 343, 219; 192/83, 94, 114 R, 200, 206, 69.4, 192/69.43, 54.2; 180/247, 65.6, 371, 372; 403/1
See application file for complete search history.

(56) References Cited

U.S. PATENT DOCUMENTS

| | | | | |
|---|---|---|---|---|
| 1,668,553 A | * | 5/1928 | Douglas | 70/223 |
| 2,844,238 A | * | 7/1958 | Peterson | 403/1 |
| 3,123,169 A | * | 3/1964 | Young | 180/247 |
| 3,184,258 A | * | 5/1965 | Kapusta | 403/1 |
| 3,251,630 A | * | 5/1966 | Astley | 301/1 |
| 3,459,070 A | * | 8/1969 | Holdeman | 475/337 |
| 3,504,563 A | * | 4/1970 | Polak | 475/300 |
| 3,504,564 A | * | 4/1970 | Kell | 475/300 |
| 3,686,978 A | * | 8/1972 | Knoblach et al. | 475/296 |
| 4,043,226 A | * | 8/1977 | Buuck | 475/158 |
| 4,181,042 A | * | 1/1980 | Rau et al. | 475/138 |
| 4,269,293 A | * | 5/1981 | Martin | 192/12 D |
| 4,327,821 A | * | 5/1982 | Telford | 192/35 |
| 4,334,590 A | * | 6/1982 | Plumb | 180/247 |
| 4,337,003 A | | 6/1982 | Juhl | |
| 4,453,852 A | | 6/1984 | Gilcrest | |
| 4,588,322 A | * | 5/1986 | Shoemaker et al. | 403/1 |
| 4,610,558 A | | 9/1986 | Erickson | |
| 4,775,040 A | | 10/1988 | Telford | |

(Continued)

OTHER PUBLICATIONS

Extended European Search Report mailed Jun. 19, 2012 in related European Patent Application No. 11003590.4.

(Continued)

*Primary Examiner* — Troy Chambers
*Assistant Examiner* — Valentin Craciun
(74) *Attorney, Agent, or Firm* — Faegre Baker Daniels LLP

(57) ABSTRACT

A drive unit disconnect mechanism is operable to transmit or disconnect power from a vehicle power source to a driven unit, and can be disengaged by multiple methods depending on how much force is required to separate the internal components of the mechanism. In a first, relatively quicker method, a handle is pulled axially away from the hub to withdraw and internal gear from splined engagement with a corresponding driven gear. In a second, relatively slower method, the handle is rotated to threadably withdraw the entire disconnect mechanism from the hub, which in turn withdraws the internal gear from splined engagement with the driven gear. The quicker method is desirable in most instances, but the slower method allows disconnection of the driven unit from the vehicle power source when gear pressure prevents or impedes the quicker method.

14 Claims, 12 Drawing Sheets

(56) References Cited

U.S. PATENT DOCUMENTS

| | | | | |
|---|---|---|---|---|
| 5,261,801 | A | * | 11/1993 | Stone ............................. 418/69 |
| 5,267,915 | A | * | 12/1993 | Estabrook ..................... 475/269 |
| 5,520,272 | A | | 5/1996 | Ewer et al. |
| 5,597,058 | A | | 1/1997 | Ewer |
| 5,702,162 | A | * | 12/1997 | Pressler ....................... 301/105.1 |
| 5,899,307 | A | * | 5/1999 | Zaun et al. ................. 192/69.43 |
| 6,458,057 | B2 | * | 10/2002 | Massaccesi et al. .......... 475/302 |
| 6,607,049 | B2 | * | 8/2003 | Cigal ........................... 180/305 |
| 6,702,070 | B2 | | 3/2004 | Smith |
| 6,830,142 | B2 | * | 12/2004 | Weilant ....................... 192/84.92 |
| 7,331,894 | B2 | * | 2/2008 | Sowul et al. ................... 475/138 |
| 2002/0125060 | A1 | * | 9/2002 | Cigal ............................. 180/305 |

OTHER PUBLICATIONS

Catalog—Power Wheel Drives, Warner Gear, Division Borg-Warner Corporation, Jun. 1, 1982.

* cited by examiner

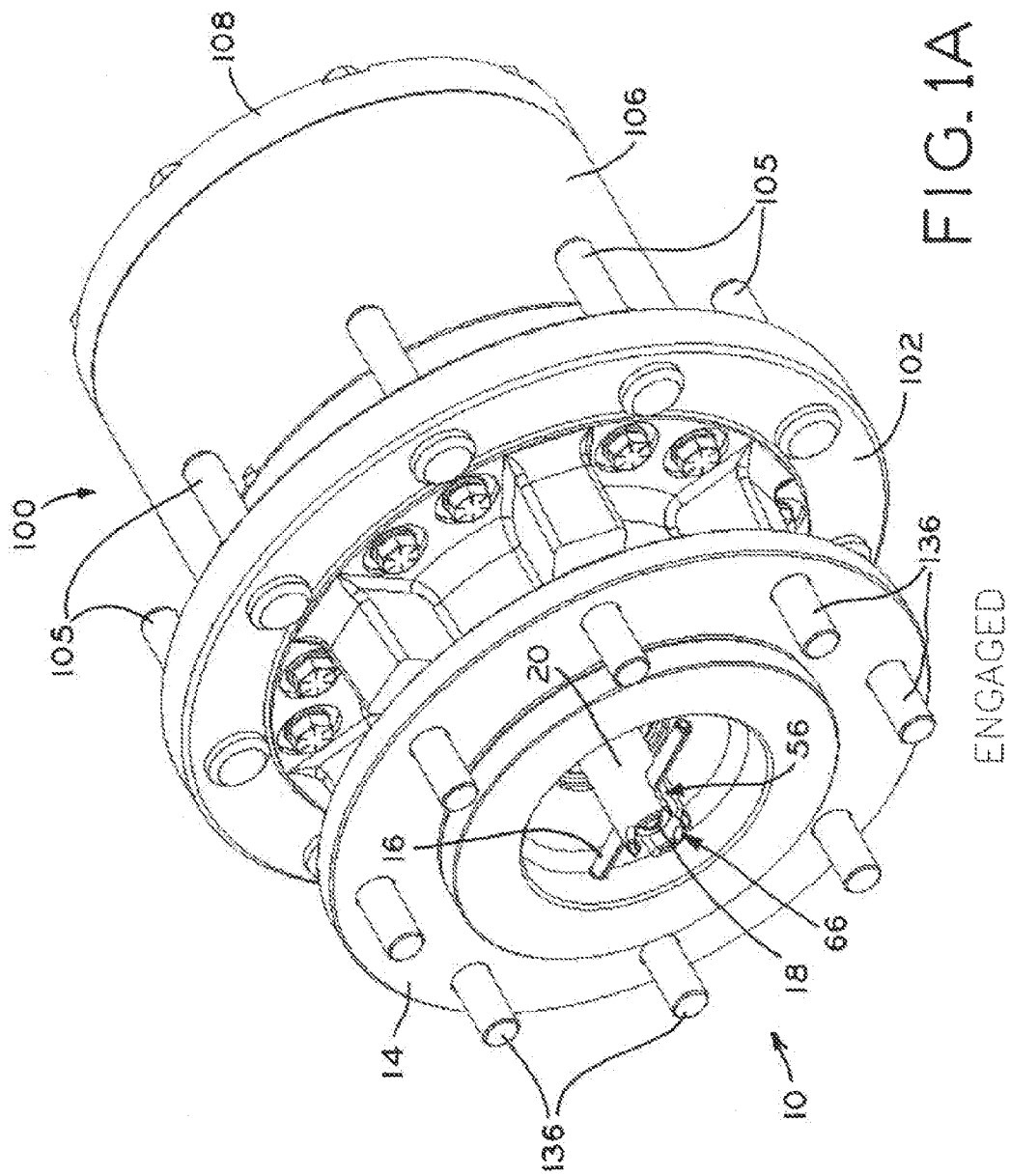

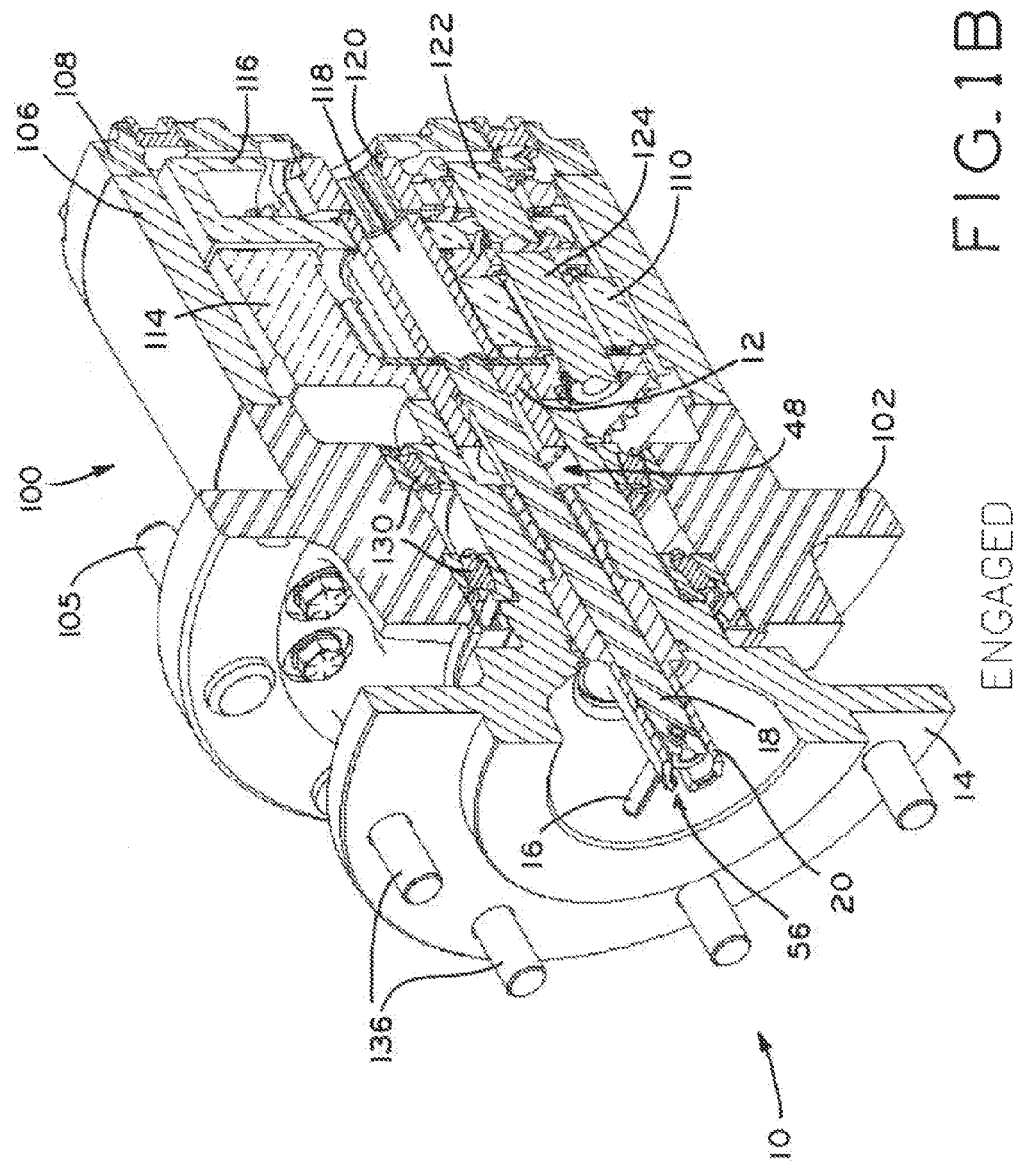

HANDLE DISENGAGED

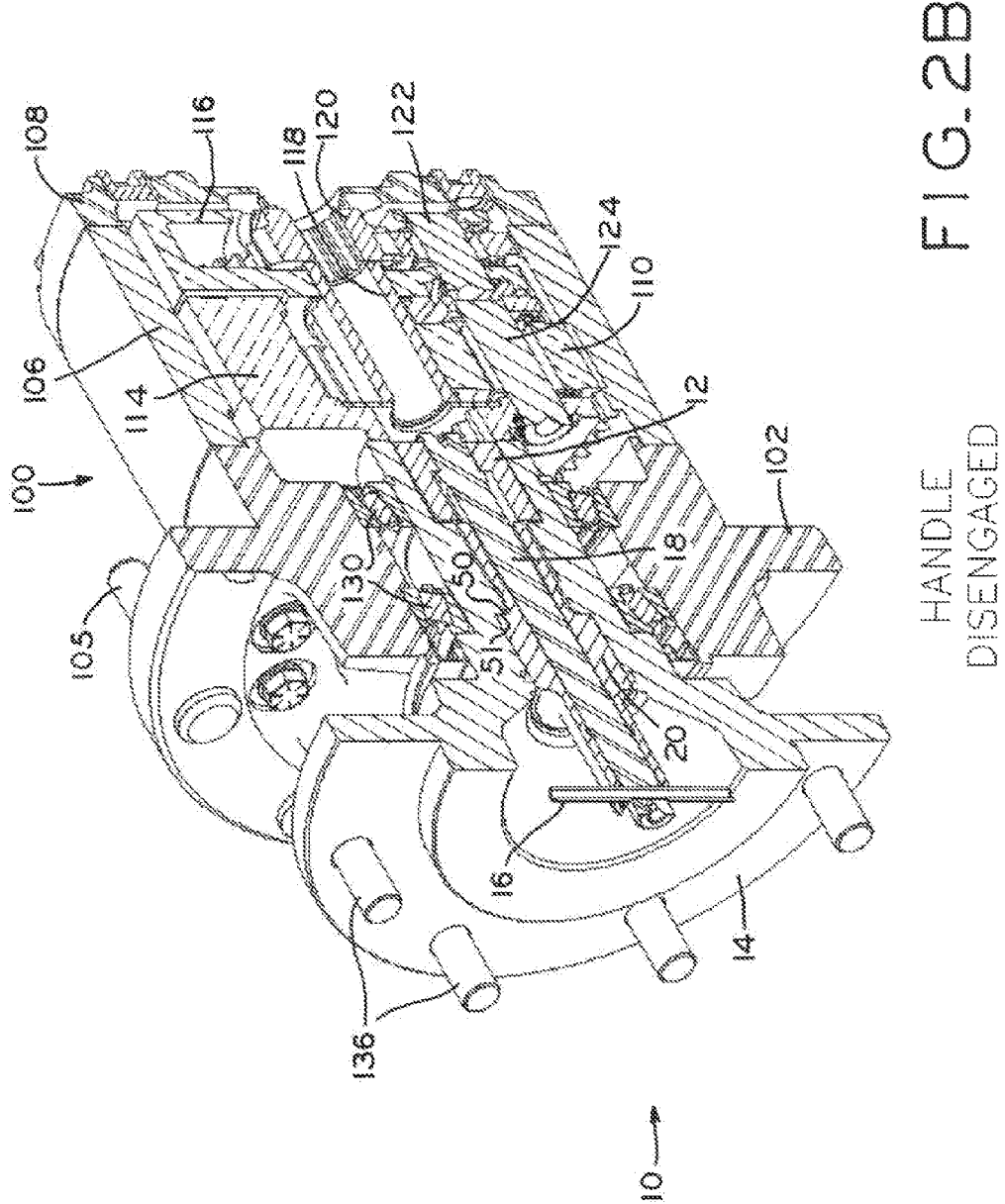

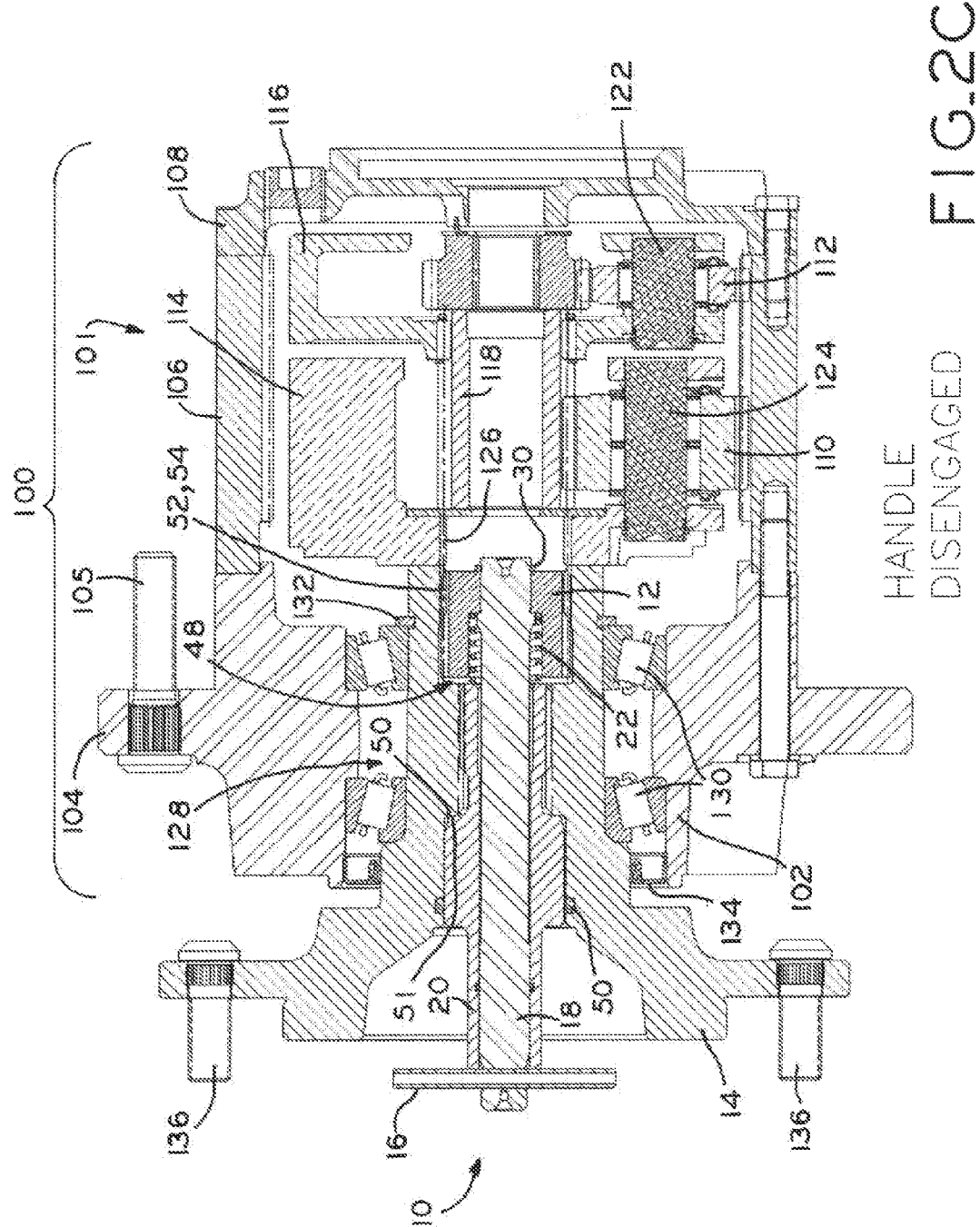
FIG.2C  HANDLE DISENGAGED

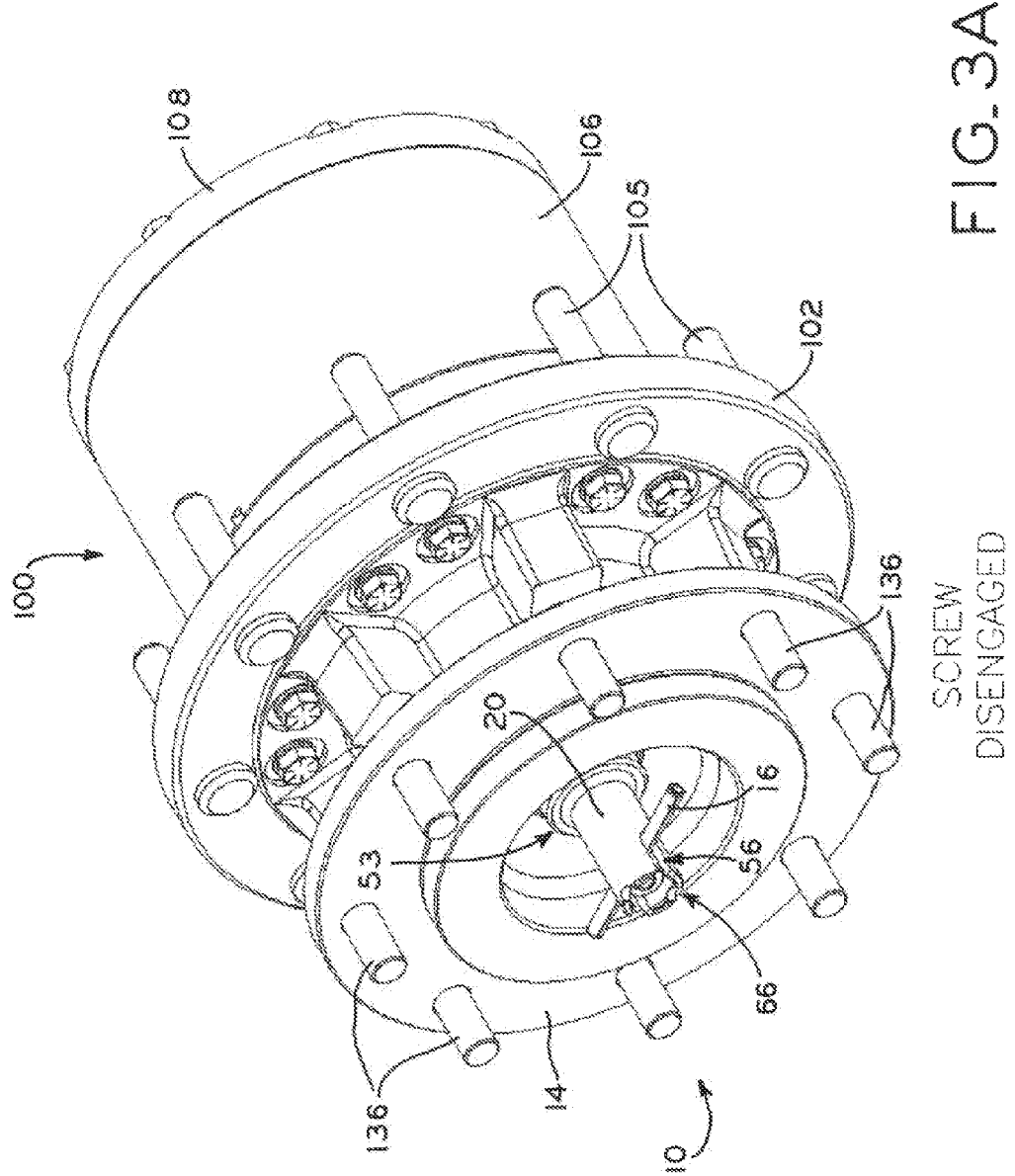

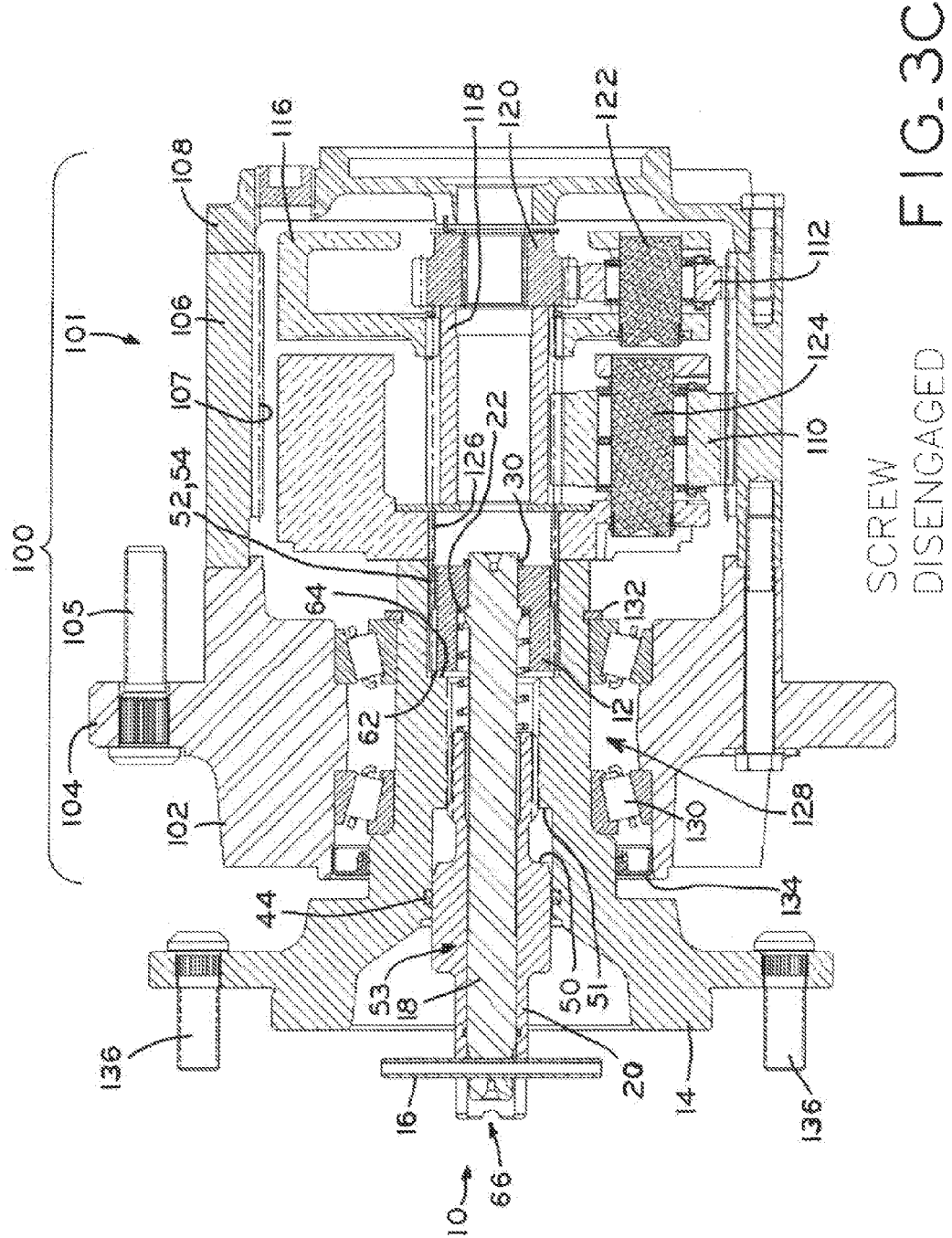
FIG. 3C SCREW DISENGAGED

QUICK DISCONNECT FOR A DRIVE UNIT

CROSS-REFERENCE TO RELATED APPLICATIONS

This application claims the benefit under 35 U.S.C. §119(e) of U.S. Provisional Patent Application Ser. No. 61/370,474 filed Aug. 4, 2010 and entitled QUICK DISCONNECT FOR A DRIVE UNIT, the entire disclosure of which is hereby expressly incorporated herein by reference.

BACKGROUND

1. Technical Field

The present disclosure relates to vehicle power transmission units, and, more particularly, to disconnect devices for selectively disengaging the vehicle transmission unit from driven vehicle wheels.

2. Description of the Related Art

Large industrial machinery, such as earth moving equipment and other construction vehicles, may use individual power transmission units mounted at the hub of each driven wheel to accomplish sufficient gear reduction for the heavy loads, large wheels, and low speeds frequently employed by such vehicles. These individual power transmission units are sometimes referred to as "wheel drives" and may house a transmission connectable to a power source mounted exterior of the wheel drive. For example, a wheel drive unit may operate to link a power source output shaft to a driven unit (such as a wheel), such that the driven unit is selectively drivingly engaged with the primary vehicle transmission.

In some configurations, a wheel drive unit may be configured to accommodate axial displacement of a coupling shaft or sleeve, which selectively disengages the driven unit from the powered transmission output shaft, which in turn disengages the wheel from the primary vehicle power source and allows the vehicle to "free wheel". Generally speaking, these selectively engageable drive units utilize axially moveable structures contained within the hub of the drive unit, with the structures manually accessible from the outside of the vehicle for engagement or disengagement. When an operator wishes to disengage or engage an individual wheel from the vehicle's primary power source via a drive unit, the operator manipulates the axially engageable structure to toggle an internal gearing mechanism between engaged and disengaged configurations.

One known disconnect system which operates to disconnect a driven shaft from individual wheels is disclosed in U.S. Pat. No. 5,597,058 to Ewer. The '058 patent discloses a hub lock for a vehicle, moveable between a manually engaged position and a disengaged position. For manual engagement and disengagement, a dial is turned to cause a nut to move inwardly or outwardly on threads formed on the dial. In the engaged position, the nut is moved outwardly to compress a first spring, which urges a clutch ring into engagement with a drive gear and thereby interlocks the drive axle with the hub lock housing. When the nut is moved inwardly, a second spring is compressed on the opposite side of the clutch ring to urge the clutch ring out of engagement with the drive gear.

Integrated drive units are similar to regular wheel drive units, but further include an integrated power input device, such as a hydraulic motor. For example, a hydraulic motor may be linked to the integrated drive unit via an output shaft (driven by the motor) coupled to an input shaft selectively engaged with the wheel-driving output of the drive unit. Like a non-integrated wheel drive unit, integrated drive units may be configured to accommodate axial displacement of a coupling shaft to allow the input shaft to be disengaged from the wheel so that the wheel can rotate independently of the vehicle's primary transmission, i.e., "free wheel".

One example of a disconnect mechanism used with an integrated drive unit is disclosed in U.S. Pat. No. 4,588,322 to Shoemaker et al. The '322 patent discloses a disconnect mechanism with a disconnect shaft that moves into and out of driving engagement with a coupling sleeve. A spring resiliently urges the disconnect shaft toward an engaged position, forming a splined engagement between the shaft and the sleeve. This splined engagement transfers driving force from a hydraulic motor to the disconnect shaft via the sleeve, the disconnect shaft drives a spindle, and the spindle drives a wheel hub. To disengage the disconnect shaft from the sleeve, a handle is pulled directly outwardly from a slot formed in the spindle, and the handle is then rotated out of alignment with the slot to maintain the disengaged position of the disconnect shaft against the bias of the compressed spring. When so disengaged, the spindle and disconnect shaft rotate freely without resistance from the motor. Pulling the handle is the only disclosed method of disengaging the disconnect shaft from the coupling sleeve; no alternative methods of disengagement are shown or described.

Another disconnect system for use with an integrated drive unit is disclosed in U.S. Pat. No. 5,261,801 to Stone. The '801 patent discloses an engagement/disengagement mechanism in which a handle is actuated to disengage a hydraulic motor from a driven mechanism. A block or clip is inserted between the handle and the housing of the driven mechanism to maintain disengagement. To reengage the hydraulic motor with the driven mechanism, the block is removed and the handle is pushed and rotated until splines connected to the handle line up with coacting splines on the driven mechanism. A spring may be provided to urge the splines into engagement.

Disconnect mechanisms for wheel-mounted drive units are particularly useful for certain applications, such as towing of industrial machinery. When such machinery is in use under its own power, a drive unit serves to couple each wheel to the wheel's individual motor (in the case of integrated drive units) or to the primary vehicle power source (in the case of non-integrated drive units). However, when the machinery is not in use, it may be desirable to tow the machinery to another location. To avoid towing against the resistance of the motor(s) or vehicle transmission, a disconnect mechanism may be used to disengage each wheel from its respective drive unit so that the wheels can "freewheel" during the towing procedure.

As discussed above with respect to '058, '322 and '801 patents, substantial design efforts have focused on providing hub-based connection/disconnection mechanisms. These known disconnect mechanisms purport to provide convenience to the user, but do so at a cost in terms of flexibility and robustness.

For example, industrial machinery utilizing drive units may be subjected to frequent engagement and disengagement in harsh and unpredictable service environments, such as in off-road in varied terrain, in heavy-duty applications, and/or in inclement weather conditions. On hilly terrain, a vehicle may be parked on a grade and oriented up or down the slope. When so parked, the vehicle will typically be left in gear so that the transmission resists potential rolling of the vehicle up or down the slope. However, this resistance places the transmission components under pressure, including the components of a quick-disconnect mechanism.

Spring pressure may be insufficient to overcome the substantial frictional forces that arise between components of a wheel drive when under pressure, effectively rendering a mechanism that relies on such disengagement mechanisms unable to effect the desired disconnection of the wheel drive. Similarly, disengaging a disconnect mechanism by a user-exerted pull-out force may also be difficult or impossible when the mechanism is under pressure, particularly where the user himself may be subject to adverse conditions (i.e., rain, mud, cold, etc).

Therefore, what is needed is a hub based engagement/disengagement drive unit mechanism that is robust, intuitive, manipulable without any special tools, and easy to operate under a wide variety of operating conditions, while also being actuatable when the associated wheel drive is under pressure.

SUMMARY

The present disclosure provides a drive unit disconnect mechanism operable to transmit or disconnect power from a vehicle power source to a driven unit, in which the mechanism can be disengaged by multiple methods depending on how much force is required to separate the internal components of the mechanism. In a first, relatively quicker method, a handle is pulled axially away from the hub to withdraw and internal gear from splined engagement with a corresponding driven gear. In a second, relatively slower method, the handle is rotated to threadably withdraw the entire disconnect mechanism from the hub, which in turn withdraws the internal gear from splined engagement with the driven gear. The quicker method is desirable in most instances, but the slower method allows disconnection of the driven unit from the vehicle power source when gear pressure prevents or impedes the quicker method.

The mechanism includes an outer shaft threadably engaged to a hub of a drive unit and an inner shaft axially moveable within the outer shaft. Optionally, the inner shaft may be spring biased toward an engaged position. To effect quick disengagement, a handle coupled to the inner shaft is pulled outwardly, axially displacing the inner shaft and rapidly withdrawing a coupling gear from engagement with a driven gear. The handle may then be rotated to lock the disconnect mechanism in this disengaged configuration.

In addition to axial displacement of the handle and inner disconnect shaft to quickly engage or disengage the disconnect mechanism, the handle may be used to rotate the outer shaft to at least partially threadably disengage the outer shaft from the hub, which in turn places the disconnect mechanism in a "screw-disengaged" configuration. As the outer shaft is threadably withdrawn from the hub, the inner shaft and coupling gear are axially displaced together with the outer shaft. As these components move axially outward along the thread axis, the coupling gear is slowly withdrawn from engagement with the driven gear. Advantageously, this threaded disengagement may be effected even when the drive unit and disconnect unit are under pressure, such as when the associated vehicle is parked on a hill. If such pressure prevents the coupling gear from being "quick-disconnected" by axially displacing the handle and inner shaft, the handle can instead be rotated to affect the slower "screw-disengagement" of the mechanism.

In one form thereof, the present invention provides a disconnect mechanism having an engaged configuration and a disengaged configuration, the mechanism comprising: a hub attachable to a driven unit, the hub having an inward side and an opposing, user-accessible outward side, the hub having a threaded bore extending from the inward side to the outward side; an outer shaft having a bore extending axially therethrough, the outer shaft defining a threaded engagement with the bore of the hub to axially move the outer shaft between an outer-shaft seated position in which the outer shaft is relatively inwardly disposed with respect to the hub, and an outer-shaft withdrawn position in which the outer shaft is relatively outwardly disposed with respect to the hub; an inner shaft received within the outer shaft, the inner shaft axially movable with respect to the outer shaft between an inner-shaft seated position in which the inner shaft is relatively inwardly disposed with respect to the outer shaft, and an inner-shaft withdrawn position in which the inner shaft is relatively outwardly disposed with respect to the outer shaft; and a coupling gear axially fixed to the inner shaft, the coupling gear defining: an engaged position corresponding to the engaged configuration of the disconnect mechanism, the coupling gear in the engaged position when the outer shaft is in the outer-shaft seated position and the inner shaft is in the inner-shaft seated position, and a disengaged position corresponding to the disengaged configuration of the disconnect mechanism, the coupling gear in the disengaged position when the outer shaft is in the outer-shaft withdrawn position or the inner shaft is in the inner-shaft withdrawn position.

In another form thereof, the present invention provides a disconnect mechanism for selectively disconnecting a hub from a power source, the mechanism comprising: a hub attachable to a driven unit, the hub having an inward side and an opposing, user-accessible outward side, the hub having a threaded bore extending from the inward side to the outward side; a coupling gear axially movable with respect to the hub between an engaged position in which the coupling gear extends relatively further outwardly and a disengaged position in which the coupling gear extends relatively further inwardly; means for axially toggling the coupling gear between the engaged position and the disengaged position by direct axial displacement, wherein the coupling gear is axially displaced with no mechanical advantage; and means for threadably toggling the coupling gear between the engaged position and the disengaged position by threaded rotational displacement, wherein the coupling gear is axially displaced with a mechanical advantage.

In yet another form thereof, the present invention provides a method of disengaging a driven unit from a vehicle power source, the method comprising: receiving a hub; receiving a driven gear; receiving a disconnect mechanism operable to selectively engage the hub with the driven gear via a coupling gear, the disconnect mechanism defining: an engaged configuration in which the hub is operably engaged with the driven gear; a handle-disengaged configuration in which the hub is disengaged from the driven gear by direct axial displacement of the coupling gear; and a screw-disengaged configuration in which the hub is disengaged from the driven gear by threaded disengagement of the disconnect mechanism from the hub; and with the disconnect mechanism in the engaged configuration, assessing whether the coupling gear and driven gear are under sufficient pressure to prevent disengagement of the hub from the driven gear by placing the disconnect mechanism into the handle-disengaged configuration.

BRIEF DESCRIPTION OF THE DRAWINGS

The above-mentioned and other features and advantages of the present disclosure, and the manner of attaining them, will become more apparent and the invention itself will be better understood by reference to the following description of an embodiment of the invention taken in conjunction with the accompanying drawings, wherein:

FIG. 1A is a perspective view of a drive unit disconnect mechanism connected to a drive unit assembly, with the disconnect mechanism shown in an engaged position;

FIG. 1B is a perspective, section view of the disconnect mechanism and drive unit of FIG. 1A;

FIG. 2B is a perspective, section view of the disconnect mechanism and drive unit of FIG. 2A;

FIG. 2C is an elevation, section view of the disconnect mechanism and drive unit of FIG. 2A;

FIG. 3A is a perspective view of the disconnect mechanism and drive unit of FIG. 1A, with the disconnect mechanism shown in a "screw-disengaged" configuration;

FIG. 3C is an elevation, section view of the disconnect mechanism and drive unit of FIG. 3A;

Corresponding reference characters indicate corresponding parts throughout the several views. The exemplification set out herein illustrates an exemplary embodiment of the invention, and such exemplification is not to be construed as limiting the scope of the invention in any manner.

DETAILED DESCRIPTION

Figure 1C:
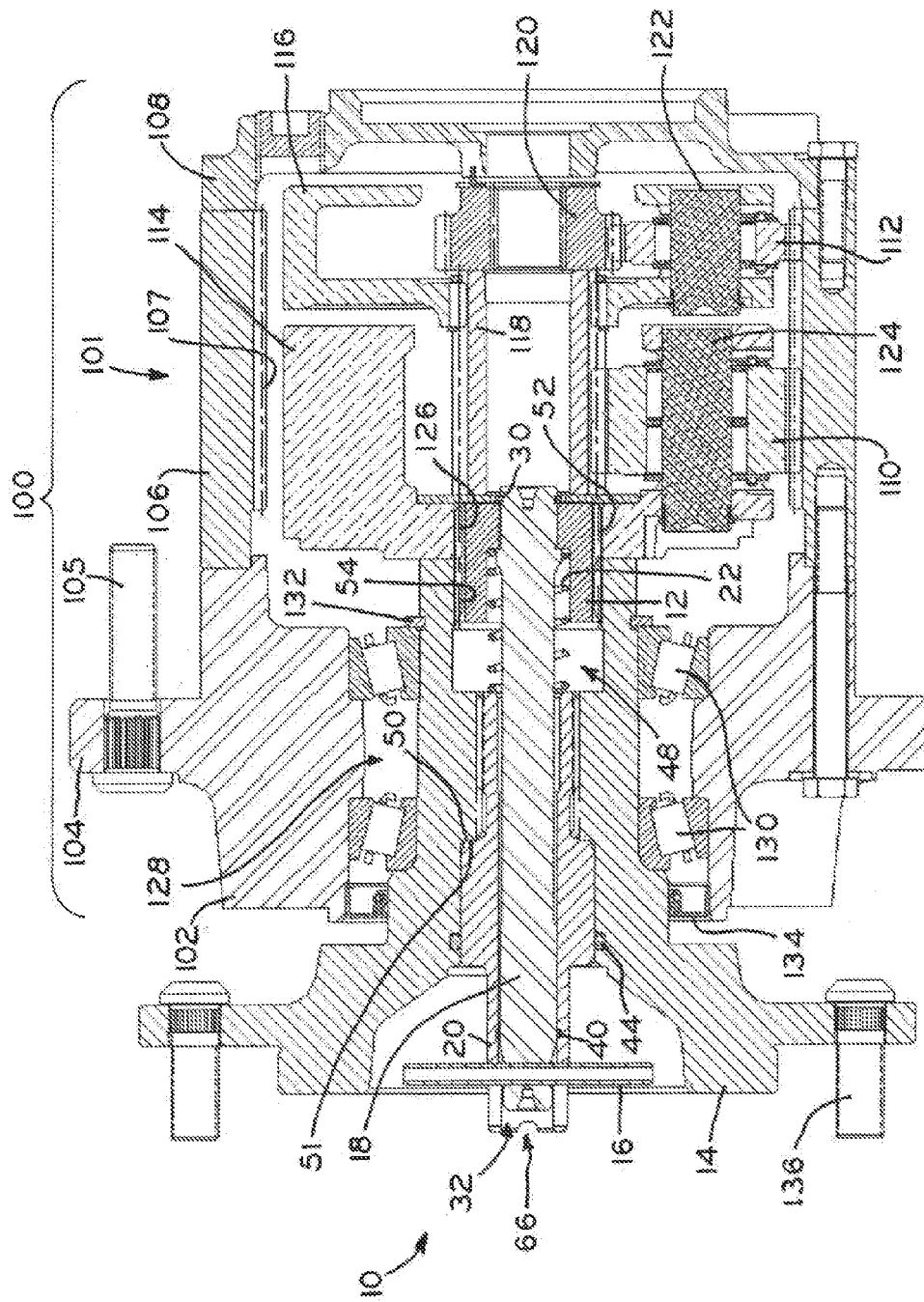
FIG. 1C is an elevation, section view of the disconnect mechanism and drive unit of FIG. 1A.
Figure 2A:
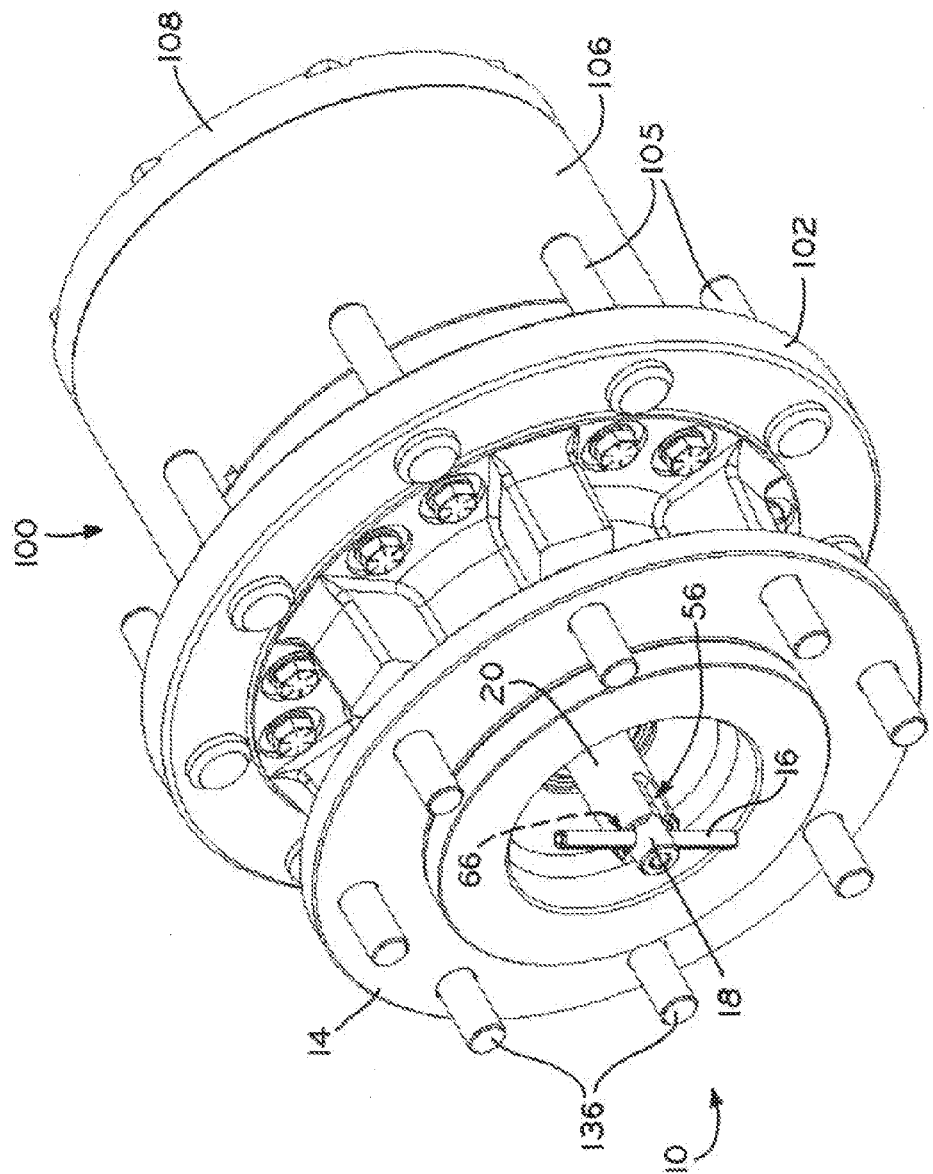
FIG. 2A is a perspective view of the disconnect mechanism and drive unit of FIG. 1A, with the disconnect mechanism shown in a "handle-disengaged" configuration.
Figure 3B:
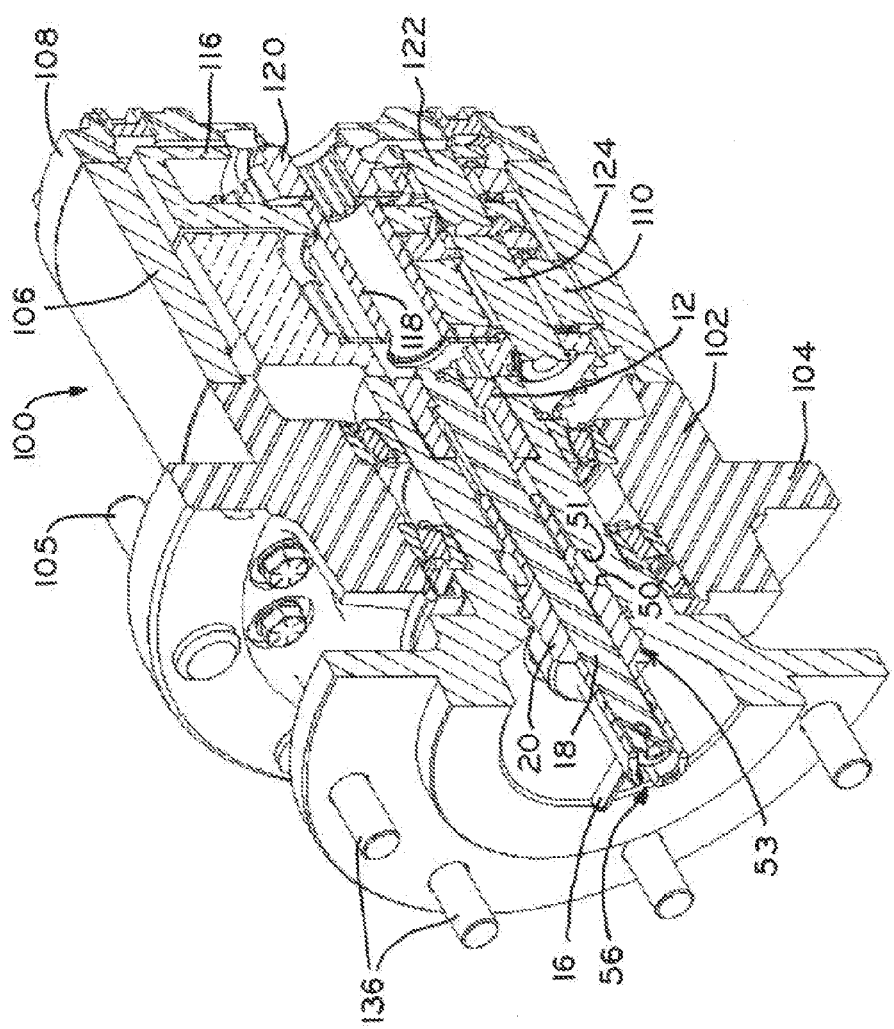
FIG. 3B is a perspective, section view of the disconnect mechanism and drive unit of FIG. 3A.

The present disclosure provides a drive unit disconnect mechanism 10 configurable between an engaged position (FIGS. 1A-1C), a "handle-disengaged" position (FIG. 2A-2C), and a "screw-disengaged" position (FIGS. 3A-3C). In the engaged configuration, coupling gear 12 of mechanism 10 rotationally fixes output hub 14 to planetary gear transmission assembly 101 of drive unit 100 (FIGS. 1B and 1C, described in detail below).

In the handle-disengaged position, handle 16 is used to draw inner disconnect shaft 18 out of outer disconnect shaft 20, so that coupling gear 12 is drawn into output hub 14 and fully disengages from planetary transmission assembly 101 of drive unit 100 (FIGS. 2B and 2C). As best shown in FIG. 2A, visual indication of the handle-disengaged configuration is provided by inner disconnect shaft 18 protruding from outer disconnect shaft 20 and handle 16 being out of alignment with slots 56 formed in outer shaft 20.

In the screw-disengaged configuration, outer disconnect shaft 20 is at least partially threadably disengaged from output hub 14, with inner disconnect shaft 18 and handle 16 axially displacing together with outer disconnect shaft 20. When outer disconnect shaft 20 is sufficiently axially displaced, coupling gear 12 disengages from planetary transmission assembly 101 of drive unit 100 in a similar manner as in the handle-disengaged configuration described above.

Figure 6A:
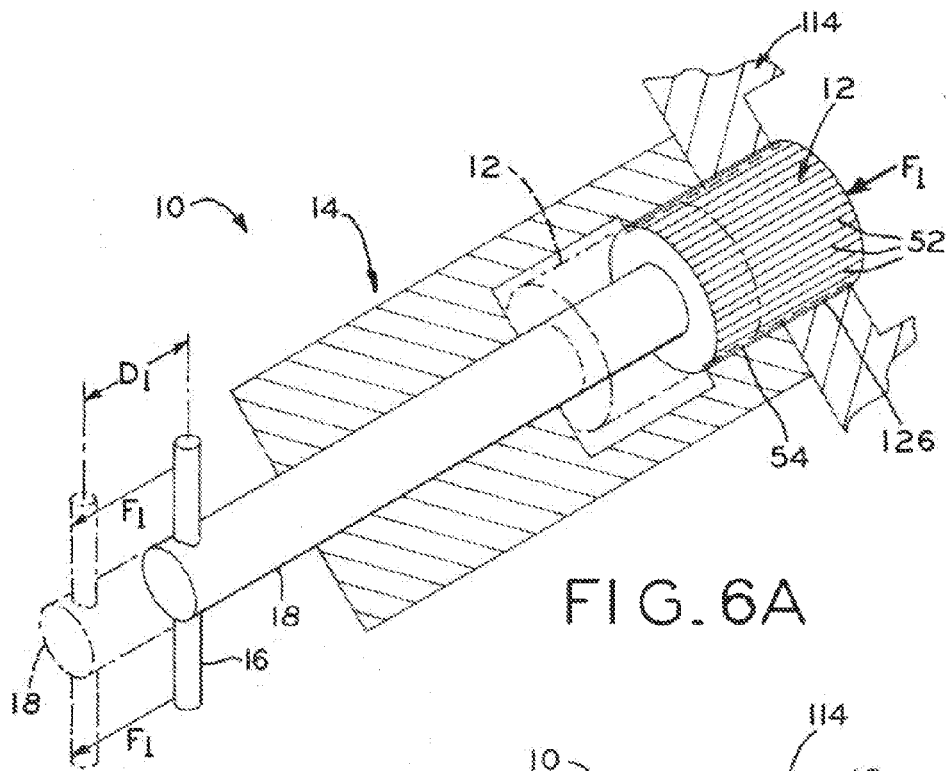
FIG. 6A is a schematic illustration of a method of disengaging a gear by directly axially displacing the gear.
Figure 6B:
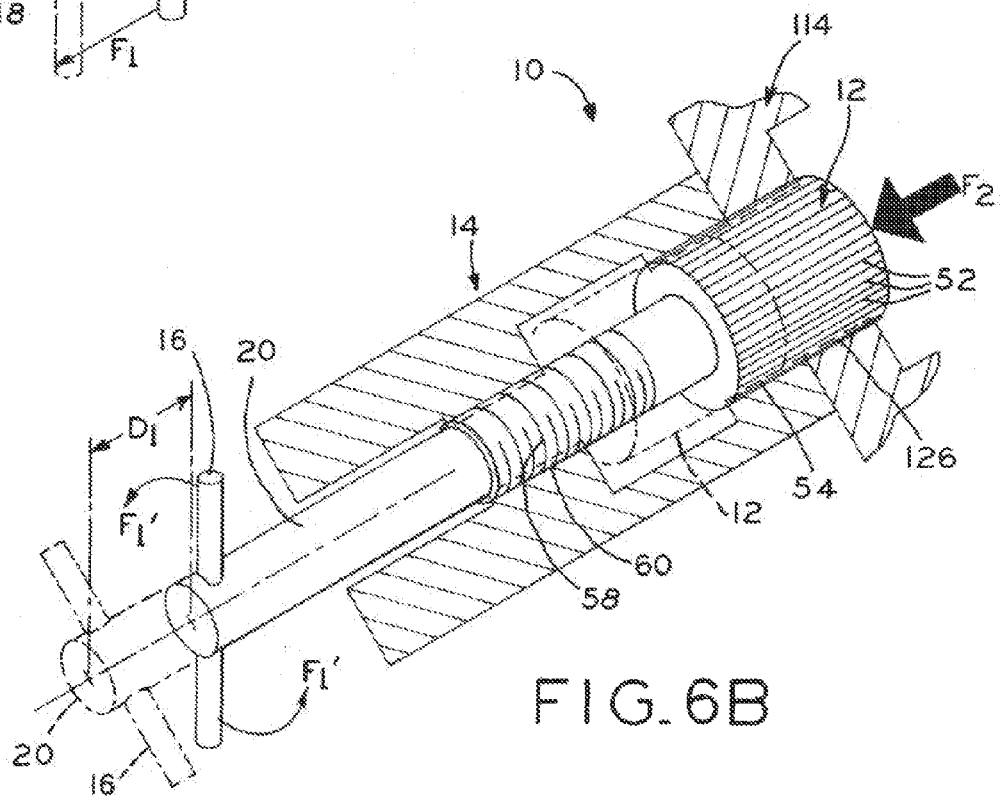
FIG. 6B is a schematic illustration of a method of disengaging a gear by rotating a shaft, such that which threaded interaction between the shaft and a surrounding structure causes axial displacement of the gear.

As schematically illustrated in FIG. 6A, disconnect mechanism 10 may be quickly and easily reconfigured from the engaged configuration to the handle-disengaged configuration by simply pulling and subsequently rotating handle 16, provided the operator can exert the required force $F_1$ to overcome any friction between coupling gear 12 and the mating structures (described below) of planetary transmission assembly 101. On the other hand, when coupling gear 12 is under a high-pressure engagement with such mating structures of planetary transmission assembly 101, force $F_1$ may not be sufficient to overcome the resulting high friction applied to coupling gear 12. Advantageously, as schematically illustrated in FIG. 6B and described in detail below, the mechanical advantage afforded by the screw-disengagement method allows coupling gear 12 to be disengaged using force $F_1'$, which has about the same magnitude as force $F_1$ but exerts a much larger disengaging force $F_2$ on coupling gear 12.

Also advantageously, as clearly shown in FIGS. 1A, 2A and 3A, disconnect mechanism 10 provides clear visual indication of its various configurations. Thus, a brief visual inspection of disconnect mechanism 10 is sufficient to determine whether output hub 14 (and any wheel connected thereto) is operably connected to drive unit 100 (in the engaged configuration) or will "freewheel" with respect to drive unit 100 (in either the screw-disengaged or handle-disengaged configurations).

1. Disconnect Mechanism Construction and Assembly

Figure 4:
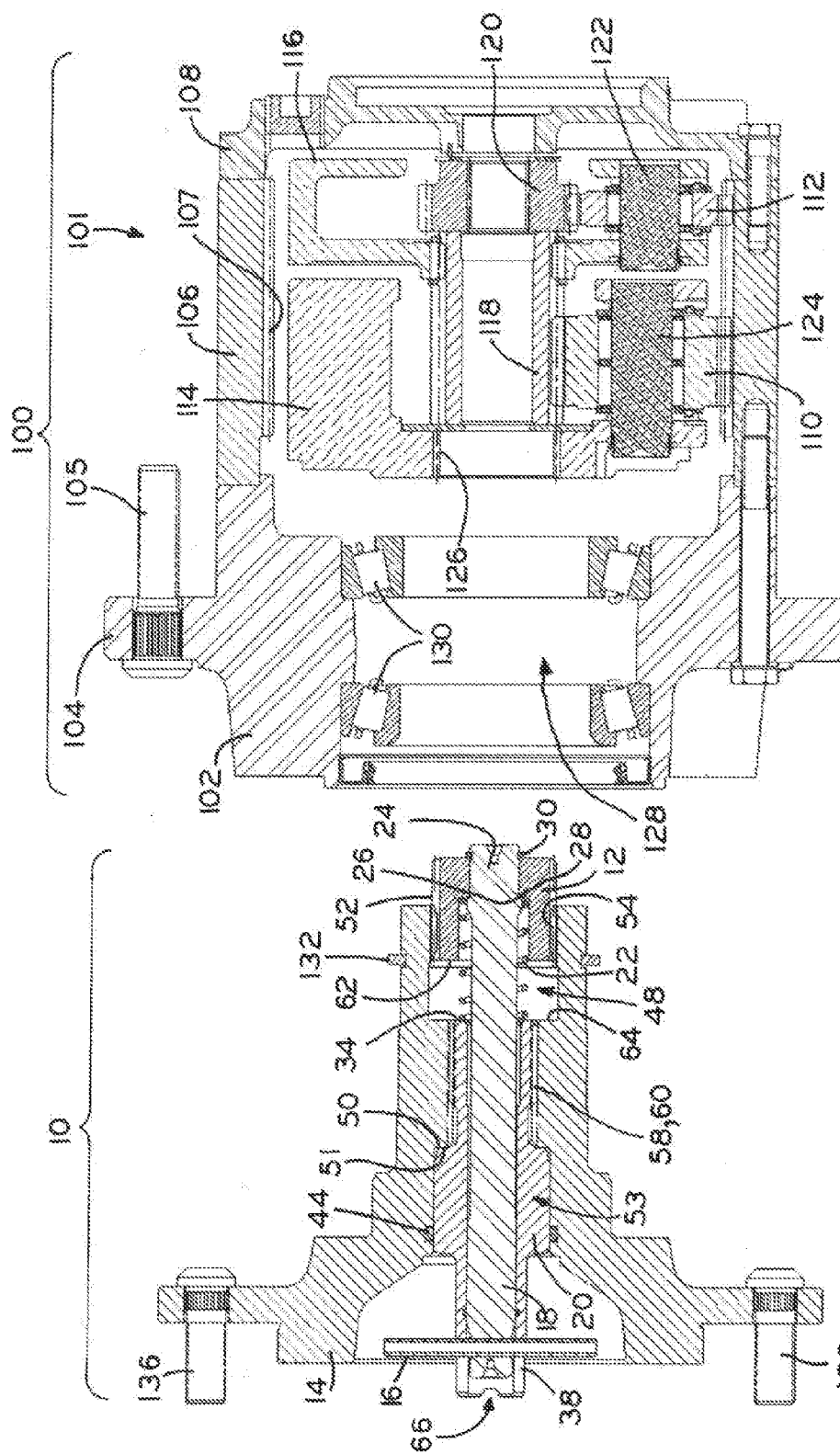
FIG. 4 is an elevation, section, partially-exploded view of the disconnect mechanism and drive unit of FIG. 1A.
Figure 5:
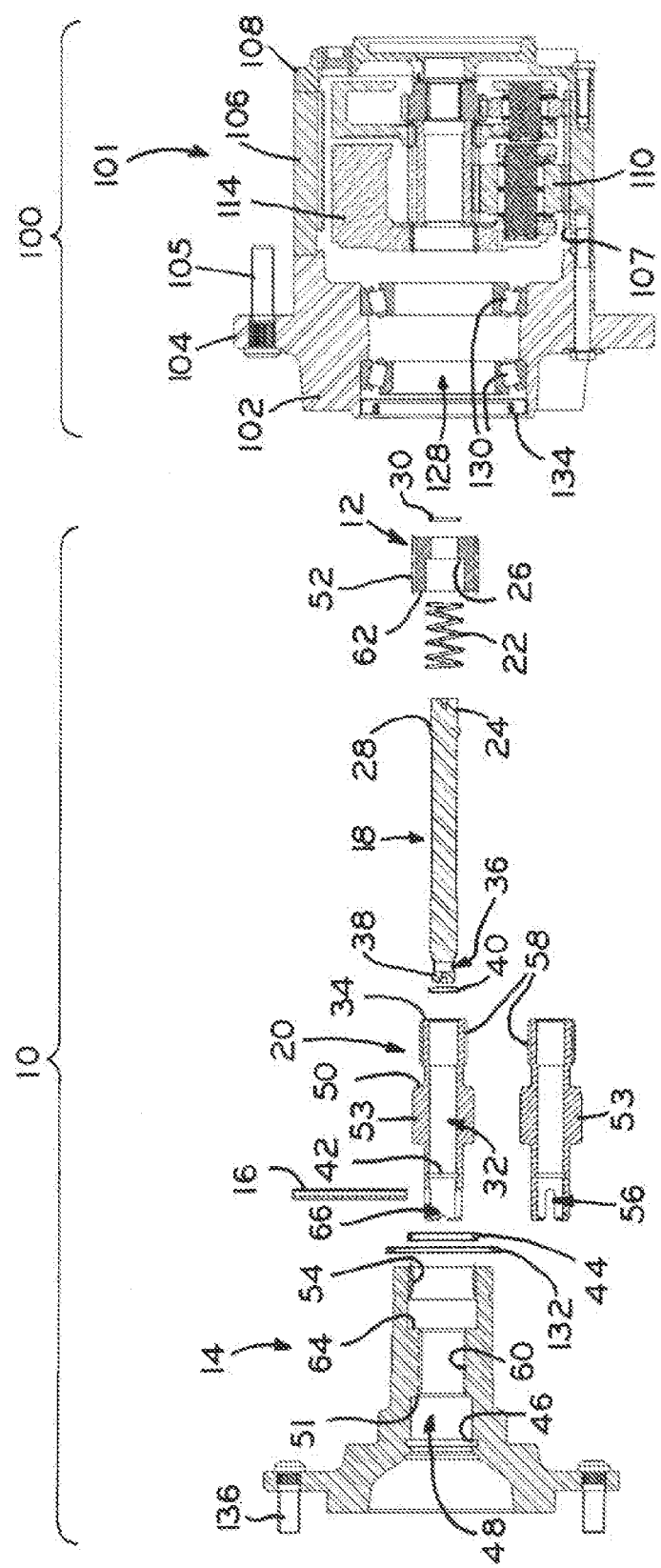
FIG. 5 is an elevation, section view of the disconnect mechanism and drive unit of FIG. 1A, with the disconnect mechanism shown removed from the drive unit.

As best seen in FIGS. 4 and 5, drive unit disconnect mechanism 10 includes coupling gear 12, output hub 14, handle 16, inner disconnect shaft 18, outer disconnect shaft 20, spring 22 and various o-rings and retaining rings used in assembly of mechanism 10 (as described below). Coupling gear 12 is axially received at gear end 24 of inner shaft 18, with inner shoulder 26 of coupling gear 12 abutting outer shoulder 28 of inner shaft 18. Coupling gear retaining ring 30 is then fixed to inner shaft 18 (FIG. 4), such that coupling gear 12 is captured between shoulder 28 and retaining ring 30 and thereby axially fixed to gear end 24 of inner shaft 18. Spring 22 is received upon inner shaft 18 and seated against inner shoulder 26 of coupling gear 12. Inner shaft 18 is then placed into bore 32 of outer disconnect shaft 20 (FIG. 5), such that the other end of spring 22 contacts end surface 34 of outer shaft 20. With spring 22 captured between shoulder 26 of coupling gear 12 and end surface 34 of outer shaft 20, any further axial movement of inner shaft 18 into bore 32 of outer shaft 20 compresses spring 22 and biases coupling gear 12 away from outer shaft 20, as discussed in detail below.

Outer shaft 20 is installed to hub 14 either before or after inner shaft 18 is received within bore 32 of outer shaft 20. Outer shaft 20 includes threaded portion 58, which engages inner threads 60 formed in bore 48 of hub 14. When outer shaft 20 is fully seated and threadably engaged within bore 48, stepped portion 53 is fully received in a correspondingly large-diameter portion of bore 48 and shoulder 50 of outer shaft 20 seats against the corresponding shoulder 51 in output hub 14 (FIGS. 4 and 5). As described in detail below, interaction between shoulders 50, 51 limits further inward axial movement of outer shaft 20 with respect to hub 14, but allows outer shaft 20 to be freely threadably disengaged from the user-accessible side of hub 14.

With outer shaft 20 coupled to hub 14 and inner shaft 18 fully received within bore 32 of outer shaft 20, handle 16 is passed through transverse bore 36 formed in handle end 38 of inner shaft 18. Outer shaft 20 includes slot 56, which is most clearly shown in FIG. 5 as part of a secondary elevation view of outer shaft 20 appearing beneath the primary elevation view thereof. As illustrated in FIG. 5, the second elevation view is rotated 90 degrees about the axis of outer shaft 20. Handle 16 is received in slot 56 upon assembly, and can be toggled between a fully seated position (FIGS. 1A-1C) and a withdrawn position (FIGS. 2A-2C). In an exemplary embodiment, spring 22 is slightly compressed when handle 16 is fully seated at the bottom of slot 56, thereby maintaining a spring bias against coupling gear 12. Handle 16 and coupling gear 12 cooperate to define the limits of axial travel of inner shaft 18 with respect to outer shaft 20, as described in detail below.

O-ring 40 may be installed within groove 42 formed in bore 32 of outer shaft 20 to provide a seal between bore 32 and the external environment. Similarly, o-ring 44 may be installed into groove 46 (FIG. 5) formed in bore 48 of output hub 14 prior to outer disconnect shaft 20 being received therein, thereby sealing bore 48 from the external environment.

Referring to FIG. 4, outer splines 52 formed on coupling gear 12 engage inner splines 54 formed in a portion of bore 48 of output hub 14 when shafts 18, 20 are assembled to hub 14. Splines 52, 54 enmesh to rotationally fix coupling gear 12 to output hub 14. As described in detail below, the axial translation of coupling gear 12 into and out of bore 48 of output hub 14 operates to engage and disengage output hub 14 from the planetary transmission assembly 101 contained within drive unit 100.

With drive unit disconnect mechanism 10 assembled, mechanism 10 may be mated to a drive unit, such as drive unit 100. Although drive unit 100 is an exemplary drive unit adapted for use with disconnect mechanism 10, it is contemplated that disconnect mechanism 10 may be mated to any number of different drive units or other power transmission units within the scope of the present disclosure.

In an exemplary embodiment, disconnect mechanism 10 is coupled to a wheel-mounted transmission, such as planetary transmission assembly 101, via drive unit 100. Drive unit 100 is in turn connected to a single, central power source which supplies the motive force for multiple wheels of a vehicle. Planetary transmission assembly 101 amplifies the torque available to the adjacent driven wheel, but also amplifies any residual torque applied to the internal gears of transmission assembly 101 and disconnect mechanism 10 when the vehicle is parked. As described below, disconnect mechanism 10 is particularly well-suited to wheel-mounted, high-reduction transmission applications because the screw-disengagement method of disengagement accommodates substantial residual torque.

As best seen in FIG. 4, drive unit 100 includes drive unit hub 102 including flange 104. Flange 104 may be used to mount drive unit 100 to another structure, i.e., a vehicle frame, using mounting bolts 105. Planetary transmission assembly 101 is bolted to drive unit hub 102 via ring gear 106, which includes internal ring gear splines 107 adapted to engage planet gears 110, 112 (as described below). Also attached to ring gear 106, and mounted generally opposite drive unit hub 102, is cover 108. For purposes of the present disclosure, cover 108 is considered to be at an "input side" of drive unit 100, in that a powered input shaft (not shown) enters through cover 108 from a primary vehicle power source and/or primary vehicle transmission. Conversely, output hub 14 is considered to be mounted at an "output side" of drive unit 100, in that power output is provided to a driven unit, i.e., a vehicle wheel, via disconnect mechanism 10 mounted within hub 102.

Contained within (and including) stationary ring gear 106 is a planetary transmission assembly 101. Referring still to FIG. 4, planetary transmission assembly 101 includes stationary ring gear 106, a plurality of output planet gears 110 coupled to output planet gear carrier 114, a plurality of input planet gears 112 coupled to input planet gear carrier 116, output sun gear 118 and powered input sun gear 120. Input sun gear 120 is rotated by a powered input shaft (not shown) which may be powered, for example, by a vehicle engine via a primary vehicle transmission. Input planet gears 112, which are in splined engagement with both input sun gear 120 and stationary splines 107 of ring gear 106, are in turn rotated about the axis of input sun gear 120, and also about the axes of respective input-side coupling shafts 122. Input planet gear carrier 116, which is also rotatably coupled to each of shafts 122, rotates about the axis of input sun gear 120 together with input planet gears 112. Input planet gear carrier 116 is fixedly coupled with output sun gear 118, which therefore rotates at the same rotational speed as input planet gear carrier 116.

In similar fashion to input sun gear 120 and input planet gears 112, the rotation of output sun gear 118 drives rotation of output planet gears 110 (which are in splined engagement with sun gear 118 and splines 107 of ring gear 106) about an axis of output sun gear 118 and about respective axes of output-side coupling shafts 124. Output planet gear carrier 114, which is coupled to output-side coupling shafts 124, rotates about the axis of output sun gear 118 together with output planet gears 110. Owing to the various gear reductions created by planetary transmission assembly, output planet gear carrier 114 rotates much more slowly than input sun gear 120 (and the motor shaft which drives input sun gear 120).

Drive unit hub 102 includes bore 128 sized to receive disconnect mechanism 10. More particularly, bearings 130 disposed in bore 128 have inside diameters sized to correspond with respective outside diameters of output hub 14. Thus, when output hub 14 is received within bore 128 (as shown in FIGS. 1C, 2C and 3C), bearings 130 allow disconnect mechanism 10 to rotate freely with respect to hub 102. Output hub retaining ring 132 retains output hub 14 (and, concomitantly, disconnect mechanism 10) within bore 128 of hub 102. Bulb seal 134 may be provided to seal bore 128 from the outside environment.

With disconnect mechanism 10 assembled and coupled to drive unit 100, drive unit 100 may be installed to a vehicle frame, for example, with a driven input shaft connected to drive unit 100 via input sun gear 120, and a driven unit such as a vehicle wheel connected to output hub 14 via wheel bolts 136. As described in detail below, output planet gear carrier 114 serves as the "engagement point" for operably coupling disconnect mechanism 10 with the input shaft (not shown) via drive unit 100. More particularly, output planet gear carrier 114 includes inner splines 126 adapted to mate with outer splines 52 of coupling gear 12, such that output planet gear carrier 114 selectively drives output hub 14 (and any wheel or other driven unit attached thereto) depending on whether disconnect mechanism 10 is in an engaged or disengaged configuration.

While the planetary transmission assembly 101 shown and described herein is used for the illustrative embodiment of the present disclosure, it is also within the scope of the present disclosure to use any gear, power transmission unit or transmission assembly in conjunction with a disconnect mechanism made in accordance with the present disclosure. For example, any power transmission unit adapted to mate with coupling gear 12 may be used with disconnect mechanism 10. Another exemplary drive unit is disclosed in U.S. Pat. No. 6,607,049, entitled QUICK DISCONNECT FOR AN INTEGRATED DRIVE UNIT, filed Mar. 6, 2001 and commonly assigned with the present application, the entire disclosure of which is hereby incorporated by reference herein.

2. Disconnect Mechanism Function

Referring now to FIGS. 1A-1C, drive unit disconnect mechanism 10 is shown in an engaged configuration. In this configuration, handle 16 is fully seated in slot 56 formed in the end of outer shaft 20 (FIG. 1A). Threads 58 of outer shaft 20 are also fully threadably engaged with threads 60 of output hub 14, such that stepped portion 53 of outer shaft 20 is fully received within bore 48, and shoulder 50 of outer shaft 20 is seated against shoulder 51 of output hub 14. In this engaged configuration, coupling gear 12 protrudes from bore 48 of output hub 14 (FIGS. 1C and 4). When disconnect mechanism 10 is assembled to drive unit 100, as discussed above, the protrusion of coupling gear 12 from bore 48 results in engagement of outer splines 52 of coupling gear 12 with inner splines 126 of output planet gear carrier 114 (FIG. 1C). Thus, outer splines 52 of coupling gear 12 engage both output planet gear carrier 114 and inner splines 54 of hub 14, which rotationally fixes hub 14 and output planet gear carrier 114 to one another. When so rotationally fixed, power to input sun gear 120 is transmitted through drive unit 100 and coupling gear 12 to hub 14, with an associated gear reduction between sun gear 120 and hub 14.

Drive unit disconnect mechanism 10 may be moved to one of two disengaged configurations, in which output hub 14 rotates independently of output planet gear carrier 114. In the first disengaged configuration, referred to herein as the "handle-disengaged" configuration and schematically illustrated in FIG. 6A, handle 16 of disconnect mechanism 10 is pulled out of slots 56 to axially displace inner shaft 18 and coupling gear 12 by distance $D_1$, thereby disconnecting coupling gear 12 from output planet gear carrier 114. In the second configuration, referred to herein as the "screw-disengaged" configuration and illustrated schematically in FIG. 6B, handle 16 is left seated in slots 56 and instead used to rotate outer shaft 20 to at least partially threadably disengage outer shaft 20 from hub 14 by distance $D_1$, thereby axially displacing coupling gear 12 out of engagement with output planet gear carrier 114.

The handle-disengaged configuration of disconnect mechanism 10 is illustrated in FIGS. 2A-2C. To reconfigure disconnect mechanism 10 from the engaged configuration to the handle disengaged configuration, handle 16 is grasped and pulled out of slot 56 (FIG. 2A) in outer shaft 20. Referring to FIG. 2C, pulling handle 16 in this way, with sufficient force to counteract the biasing force of spring 22, axially slides inner disconnect shaft 18 with respect to outer disconnect shaft 20 against the biasing force of spring 22. Inner disconnect shaft 18 draws coupling gear 12 into bore 48 of output hub 14 (FIG. 2C), disengaging coupling gear 12 from splined engagement with output planet gear carrier 114. When handle 16 is clear of slots 56 (FIG. 2A), handle 16 may be rotated out of alignment with slot 56, then aligned with and seated in detents 66 (FIGS. 3A and 3C) to retain inner disconnect shaft 18 in the axially displaced, outer position.

As best seen in FIG. 2C, when handle 16 is pulled out of slot 56 to axially displace inner shaft 18, coupling gear 12 becomes fully disengaged from output planet gear carrier 114. Disconnect mechanism 10 is therefore in the "handle-disengaged" configuration, in which output hub 14 is freely rotatable independent of the planetary transmission assembly 101, (i.e., in a "free wheel" configuration). Moreover, output hub 14 is independent of any driving influence from the vehicle power source and/or primary vehicle transmission when disconnect mechanism 10 is disengaged.

Between the engaged and handle disengaged configurations, disconnect mechanism 10 may be placed in a "waiting-to-engage" configuration. The waiting-to-engage configuration occurs when handle 16 is realigned with slots 56 of outer shaft 20 and released, thereby freeing spring 22 to bias coupling gear 12 towards engagement with output planet gear carrier 114, but outer splines 52 of coupling gear 12 are not properly aligned with inner splines 126 of output planet gear carrier 114. With splines 52, 126 misaligned, coupling gear 12 will not engage and disconnect mechanism will instead enter the "waiting-to-engage" configuration. In this configuration, handle 16 remains aligned with, and partially captured within slots 56, while spring 22 continues to urge coupling gear 12 toward engagement with output planet gear carrier 114. As soon as either output hub 14 or output planet gear carrier 114 begins to rotate, outer splines 52 will align with inner splines 126 and spring 22 will push coupling gear 12 into engagement with output planet gear carrier 114. Thus, placing disconnect mechanism 10 into the waiting-to-engage configuration causes disconnect mechanism 10 to "automatically" move from the waiting-to-engage configuration to the engaged configuration as soon as the alignment of the internal gears makes such engagement possible.

The second or "screw-disengaged" configuration is illustrated in FIGS. 3A-3C. In this configuration, handle 16 is left engaged within slot 56 of outer shaft 20. Rather than axially displacing inner shaft 18 with respect to outer shaft 20, as described above with respect to the handle-disengagement method, the screw-disengagement method axially displaces both inner and outer shafts 18, 20. Handle 16 is used to rotate outer disconnect shaft 20 with respect to output hub 14, which remains stationary (such as by being coupled with a vehicle wheel at rest). As outer threads 58 of outer disconnect shaft 20 threadably disengage from inner threads 60 of output hub 14, outer shaft 20 withdraws from hub 14. Further, where screw-disengagement disconnect mechanism 10 begins from a fully engaged position (FIG. 1C), interaction between shoulder 50 of outer shaft 20 and shoulder 51 of hub 14 will only permit rotation (and axial displacement) in one direction, i.e., outwardly from hub 14 and toward the screw-disengaged configuration.

When outer shaft 20 has been sufficiently threadably disengaged from output hub 14, as shown in FIGS. 3B and 3C, coupling gear 12 is retracted into bore 48 (FIG. 2C) of hub 14. As described above with respect to the handle-disengagement method, such retraction of coupling gear 12 rotatably decouples output hub 14 from output planet gear carrier 114, allowing output hub 14 to "free wheel" with respect to the planetary transmission assembly 101. As described in detail below, the screw-disengagement method offers the benefit of a mechanical advantage compared to the handle-disengagement method; the screw-disengagement therefore offers a greater force for withdrawing coupling gear 12 from engagement with output planet gear carrier 114, for any given operator-produced exertion force against handle 16. This greater withdrawal force is beneficial in effecting disengagement when splines 52, 126 are under pressure or otherwise tightly engaged with one another.

As best seen by comparison of FIGS. 3C and 4, the total axial travel of coupling gear 12 towards a "disengaged" position is limited by impingement of inner face 62 of coupling gear 12 upon shoulder 64 formed within bore 48 of output hub 14. Conversely, axial displacement of coupling gear 12 in the other direction (i.e., towards an "engaged" position) is limited by impingement of handle 16 upon the ends of slots 56 formed in outer shaft 20, and/or by impingement of shoulder 50 formed by stepped portion 53 of outer shaft 20 upon the corresponding shoulder 51 formed within bore 48 of output hub 14. Thus, coupling gear 12 is only permitted to move within a controlled axial range when assembled to disconnect mechanism 10 as described above.

Upon reengagement of disconnect mechanism 10 from the screw-disengaged configuration, disconnect mechanism 10 may move into an engaged configuration or a waiting-to-engage configuration. As described above with respect to the handle-disengaged configuration, splines 52, 126 of coupling gear 12 and output planet gear carrier 114, may not align as outer shaft 20 is rotated to fully threadably engage threads 58 of outer shaft 20 with threads 60 of hub 14. If this is the case, handle 16 will outwardly advance in slots 56 as outer shaft 20 is rotated back towards a fully engaged position, with mechanism 10 entering the waiting-to-engage configuration when outer shoulder 50 of outer shaft 20 seats against shoulder 51 of hub 14 (FIGS. 4 and 5). Handle 16, inner shaft 18, and coupling gear 12 will "snap" into the engaged configuration as soon as splines 52 of coupling gear 12 align with splines 126 of output planet gear carrier 114, as described above.

3. Disconnect Mechanism Features and Benefits

Advantageously, disconnect mechanism 10 is particularly well-suited for use with planetary transmission assembly 101 and other gear-reduction transmission systems because the screw-disengagement method (described in detail above) offers a mechanical advantage that facilitates disconnection of gears under high pressure.

For example, a vehicle parked up- or down-hill with the transmission engaged will "come to rest" against the resistive force of the (unpowered) transmission. Stated another way, the tendency of the vehicle to roll downhill is counteracted by tension or pressure in the parts of the transmission, which in turn are created by the inertial forces of a shut-off vehicle motor.

In the context of a quick-disconnect system, this pressure is also transmitted to the internal gears of the quick disconnect which couples the wheel of the vehicle to the motor and primary transmission. If the vehicle also includes a hub-based wheel drive unit 100 including additional gear reduction for each vehicle wheel, such as via planetary transmission assembly 101 described above, even greater pressure may be exerted between the internal gears of the disconnect mechanism. Particularly for the heavy construction vehicles often used with high-reduction wheel drives, the pressure on the internal gears of a quick disconnect can become substantial on even a modest grade.

In the case of the handle-disengagement method, force $F_1$ exerted on handle 16 is equal to the force exerted on coupling gear 12, as illustrated in FIG. 6A. Where such pressure exists between coupling gear 12 of disconnect mechanism 10 and output planet gear carrier 114, i.e., where the associated vehicle is parked on a sloped surface and resting against the transmission gears, exerted force $F_1$ on coupling gear 12 by pulling handle 16 directly away from hub 14 (illustrated schematically in FIG. 6A) may not be sufficient to dislodge coupling gear 12. Exertion of a larger force, such as force $F_2$ (FIG. 6B) may not within the physical ability of the operator.

Where the operator assesses that force $F_1$ generated by pulling directly on handle 16 will not be sufficient to dislodge coupling gear 16, the mechanical advantage of offered by the screw-disengagement method can be used to overcome such pressure. Like the handle-disengagement method, the screw-disengagement method is simple operation that requires no tools, as described above.

Referring now to the illustrative embodiment of FIG. 6B, the screw-disengagement method is accomplished by applying force $F_1'$ to each side of handle 16. For purposes of the present discussion, force $F_1'$ is taken to be approximately equal to force $F_1$ used for the handle-disengagement method (FIG. 6A), though either of forces $F_1$, $F_1'$ may be any force within the normal range of forces exerted by a human hand. Exerting force $F_1'$ on handle 16 results in a much smaller axial displacement of inner shaft 18 for a given amount of movement applied to handle 16. Thus, the screw-disengagement utilizes much more motion of handle 16 to accomplish a given axial displacement of coupling gear 12, which results in mechanical advantage as described below.

The equation $$[Work]=[Force]*[Distance]$$

can be rearranged as $$[Force]=[Work]/[Distance],$$

which stands for the proposition that spreading a given amount of work over a greater distance lowers the amount of force needed to accomplish that work. For purposes of the present discussion, applicants assume for mathematical simplicity that coupling gear 12 is axially displaced by a distance of 1-inch against the forces resisting such axial displacement (which forces are mostly comprised of friction between coupling gear 12 and output planet gear carrier 114). Assuming a given amount of frictional resistance, the amount of work required to move coupling gear 12 1-inch is the same regardless of whether the handle-disengagement or screw-disengagement method is used.

In the case of quick disconnect mechanism 10, the mechanical work required to displace coupling gear 12 is accomplished by user-exerted work on handle 16. Performing this user-exerted work via the handle-disengagement method requires that the mechanical work of dislodging coupling gear 12 be accomplished over the 1-inch travel of handle 16; performing the user-exerted work on handle 16 by the screw-disengagement method accomplishes the same mechanical work on coupling gear 12 over a much larger distance, giving rise to a mechanical advantage.

One full rotation of handle 16 axially displaces coupling gear 12 by the distance between an adjacent pair of threads 58, 60 (i.e., the "pitch" of threads 58, 60). In an exemplary embodiment, threads 58, 60 are male and female 1¼-7 UNC threads, respectively, meaning the mating threaded portions of outer shaft 20 and hub 14 are each 1¼-inches in diameter and have 7 threads per inch of axial travel. Thus, one full rotation of handle 16 axially displaces outer shaft 20 (and coupling gear 12) by 1/7-inch, and the user-exerted work required to axially displace coupling gear 12 by 1-inch is spread over 7 full rotations of handle 16.

In this exemplary embodiment, handle 16 is about 2¼ inches long (i.e., sized to be easily grasped by the hand of an operator), so total movement of an end of handle 16 during one full rotation is equal to pi*2.25, which is slightly more than 7 inches. Total movement of handle 16 in the screw disengagement method is therefore [7 handle rotations]*[~7 inches per handle rotation]=~49 inches. This total movement by the screw-disengagement method compares to only 1-inch for the direct handle-disengagement method, meaning the amount of force required to do the work of disengaging coupling gear 12 by the screw-disengagement method is $1/49^{th}$ the force required by the handle-disengagement method. Stated another way, screw-disengagement of the exemplary disconnect mechanism 10 can dislodge a coupling gear 12 under 49 times more pressure with output planet gear carrier 114 than can be done with the handle disengagement method, for a given user-exerted force on handle 16.

As detailed above, the screw-disengagement method advantageously allows coupling gear 12 to be disengaged from planet gear carrier 114 from a high-pressure, high-friction engagement. On the other hand, where the pressure between coupling gear 12 and output planet gear carrier 114 is relatively small (i.e., when the associated vehicle is parked on level ground), disconnect mechanism 10 offers the handle-disengagement method for a much faster, tool-free and simple disengagement method.

Regardless of the disengagement method, an operator can engage or disengage disconnect mechanism 10 even in adverse environmental conditions. For example, because fine motor tasks are not required with the present tool-less design (i.e., aligning a pin with a hole, aligning a tool with a part, etc), disconnect mechanism 10 can be manipulated by an operator wearing gloves or mittens, even in cold, wet or muddy conditions. Similarly, since no external parts are needed to use disconnect mechanism 10, no parts needed for engagement/disengagement of same can be lost or misplaced.

Also advantageously, each of the engaged, handle disengaged, screw-disengaged, and waiting-to-engage configurations of disconnect mechanism 10 are visually distinct configurations, thereby enabling an observer to readily ascertain the configuration of disconnect mechanism 10 (i.e., handle-disengaged, screw-disengaged, engaged, or waiting-to-engage) with only a moment of visual or tactile inspection.

In the engaged configuration, stepped portion 53 of outer shaft 20 is fully received within bore 48 of output hub 14, and handle 16 is fully seated within slots 56 of outer shaft 20. Further, inner disconnect shaft 18 appears inset within bore 32 of outer disconnect shaft 20 from the operator-accessible side of mechanism 10, such that a portion of the inner wall defined by bore 32 is visible.

In the handle-disengaged configuration, stepped portion 53 of outer shaft 20 remains fully seated within bore 48 of output hub 14, but handle 16 is fully removed from slots 56 and is rotated out of alignment therewith. Handle 16 may be engaged with detents 66. Further, a portion of inner disconnect shaft 18 protrudes out of bore 32 of outer disconnect shaft 20, exposing part of the outer arcuate face of inner shaft 18.

In the screw-disengaged configuration, handle 16 is received within slots 56 and inner disconnect shaft 18 is inset within bore 32 of outer disconnect shaft 20, similar to the engaged configuration discussed above. Unlike the engaged configuration, however, stepped portion 53 of outer shaft 20 protrudes substantially outwardly from output hub 14, and the end of outer shaft 20 protrudes farther outwardly from hub 14 than when in the engaged configuration. Mechanism 10 is in a fully screw-disengaged configuration when handle 16 can no longer be rotated to further extract shaft 20 from hub 14 (owing to the impingement of coupling gear 12 upon shoulder 64 formed in hub 14, as described above).

Finally, in the waiting-to-engage configuration, stepped portion 53 of outer shaft 20 is fully seated against output hub 14, similar to the engaged and handle-disengaged positions described above. Handle 16 is aligned with, but only partially received within slots 56. Handle 16 is not fully received within slots 56, and inner shaft 18 protrudes slightly from bore 32 of outer shaft 20, exposing a portion of the outer arcuate face of shaft 18.

Thus, each configuration of disconnect mechanism 10 is unique and easily distinguishable from the other configurations. Notably, the "telltale" visual cues corresponding to the handle and screw-disengaged configurations cannot coexist because of the axial displacement limitations imposed by coupling gear 12 and output hub 14. More particularly, inner face 62 of coupling gear 12 contacts shoulder 64 within bore 48 of output hub 14 when disconnect mechanism 10 is in the screw-disengaged configuration. Therefore, handle 16 cannot be extracted from slots 56. Similarly, stepped portion 53 of outer shaft 20 cannot be significantly displaced away from its seated position within bore 48 of output hub 14 when handle 16 is removed from slots 56, again because further axial displacement is prevented by the impingement upon inner face 62 upon shoulder 64.

Also advantageously, disconnect mechanism 10 automatically reorients itself from the waiting-to-engage configuration to the engaged configuration under the biasing force of spring 22. Thus, disconnect mechanism 10 may simply be placed in the waiting-to-engage configuration, with the operator assured that slight vehicle movement will subsequently place disconnect mechanism 10 in the engaged configuration. As noted above, the operator can visually verify that such engagement has occurred with a brief glance after such slight vehicle motion has occurred.

While this disclosure has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A disconnect mechanism having an engaged configuration and a disengaged configuration, the mechanism comprising:
   a hub attachable to a driven unit, said hub having an inward side and an opposing, user-accessible outward side, said hub having a threaded bore extending from said inward side to said outward side;
   an outer shaft having a bore extending axially therethrough, said outer shaft defining a threaded engagement with said bore of said hub to axially move said outer shaft between an outer-shaft seated position in which said outer shaft is relatively inwardly disposed with respect to said hub, and an outer-shaft withdrawn position in which said outer shaft is relatively outwardly disposed with respect to said hub;
   an inner shaft received within said outer shaft, said inner shaft axially movable with respect to said outer shaft between an inner-shaft seated position in which said inner shaft is relatively inwardly disposed with respect to said outer shaft, and an inner-shaft withdrawn position in which said inner shaft is relatively outwardly disposed with respect to said outer shaft; and
   a coupling gear axially fixed to said inner shaft, said coupling gear defining:
      an engaged position corresponding to the engaged configuration of the disconnect mechanism, said coupling gear in said engaged position when said outer shaft is in said outer-shaft seated position and said inner shaft is in said inner-shaft seated position, and
      a disengaged position corresponding to the disengaged configuration of the disconnect mechanism, said coupling gear in said disengaged position when said outer shaft is in said outer-shaft withdrawn position or said inner shaft is in said inner-shaft withdrawn position.

2. The disconnect mechanism of claim 1, further comprising a handle connected to said outer shaft, said handle cooperating with a thread pitch of said threaded engagement to create a mechanical advantage when said outer shaft is threadably toggled between said outer-shaft seated position and said outer-shaft withdrawn position, wherein movement of said handle by a movement distance causes an axial movement of said coupling gear by less than the movement distance.

3. The disconnect mechanism of claim 1, further comprising a handle connected to said inner shaft, wherein movement of said handle by a movement distance results in axial movement of said coupling gear by the movement distance.

4. The disconnect mechanism of claim 1, in combination with a wheel drive unit including a powered input gear and a driven gear, said hub operably connected to said driven gear when said coupling gear is in said engaged position, such that power from said powered input gear is transferred to said hub, and said hub operably disconnected from said driven gear when said coupling gear is in said disengaged position, such that said hub is independently rotatable with respect to said powered input gear.

5. The combination of claim 4, wherein said wheel drive unit comprises a planetary transmission assembly.

6. The disconnect mechanism of claim 1, further comprising a spring, said spring urging said inner shaft toward said inner-shaft seated position.

7. The disconnect mechanism of claim 1, wherein:

said outer shaft comprises a stepped portion defining a shoulder formed on said outer shaft; and said bore of said hub comprises a shoulder within said bore, said shoulder of said hub cooperating with said shoulder of said outer shaft to limit inward axial movement of said outer shaft, thereby defining said outer-shaft seated position.

8. The disconnect mechanism of claim 1, wherein:

said coupling gear defines an inner face;

said hub defines an inner shoulder disposed within said bore of said hub;

said inner face of said coupling gear impinges on said inner shoulder of said hub when said inner shaft is in said inner-shaft withdrawn position to prevent further outward axial travel of said inner shaft;

said inner face of said coupling gear impinges on said inner shoulder of said hub when said outer shaft is in said outer-shaft withdrawn position to prevent further outward axial travel of said inner shaft;

whereby said inner-shaft withdrawn position cannot exist concurrently with said outer-shaft withdrawn position.

9. A disconnect mechanism for selectively disconnecting a hub from a power source, the mechanism comprising:

a hub attachable to a driven unit, said hub having an inward side and an opposing, user-accessible outward side, said hub having a threaded bore extending from said inward side to said outward side;

a coupling gear axially movable with respect to said hub between an engaged position in which said coupling gear extends relatively further outwardly and a disengaged position in which said coupling gear extends relatively further inwardly;

means for axially toggling said coupling gear between said engaged position and said disengaged position by direct axial displacement, wherein said coupling gear is axially displaced with no mechanical advantage; and means for threadably toggling said coupling gear between said engaged position and said disengaged position by threaded rotational displacement, wherein said coupling gear is axially displaced with a mechanical advantage.

10. The disconnect mechanism of claim 9, wherein said coupling gear includes outer splines and said hub includes a first set of inner splines mated with said outer splines of said coupling gear, in combination with a means for transmitting power from the power source to said coupling gear including:

an input gear adapted to couple with a motor output shaft;

an output gear having a second set of inner splines, said outer splines of said coupling gear mated with both of said first set of inner splines and said second set of inner splines when said coupling gear is in said engaged position, said outer splines mated only with said first set of inner splines when said coupling gear is in said disengaged position.

11. The disconnect mechanism of claim 10, wherein said means for transmitting power comprises gear reduction means for reducing a rotational speed of said output gear with respect to said input gear.

12. The disconnect mechanism of claim 9, further comprising displacement means for directly axially displacing said means for axially toggling, said displacement means also for rotating said means for threadably toggling.

13. The disconnect mechanism of claim 9, further comprising biasing means for urging said coupling gear toward said engaged position.

14. The disconnect mechanism of claim 9, further comprising means for limiting a range of axial travel of said coupling gear.

\* \* \* \* \*